(12) United States Patent
Beckford et al.

(10) Patent No.: US 7,513,028 B2
(45) Date of Patent: Apr. 7, 2009

(54) SYSTEMS AND METHODS FOR REPAIRING A ROTOR SYSTEM KEYWAY

(75) Inventors: Alexander G. Beckford, Scotia, NY (US); Ronald J. Zawoysky, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 304 days.

(21) Appl. No.: 11/307,644

(22) Filed: Feb. 15, 2006

(65) Prior Publication Data

US 2007/0189849 A1    Aug. 16, 2007

(51) Int. Cl.
*H02K 15/00* (2006.01)
*H02K 15/02* (2006.01)

(52) U.S. Cl. .................. 29/596; 29/598; 29/402.06; 310/42; 310/270; 219/76.14

(58) Field of Classification Search ........... 29/596–598, 29/426.5, 402.116, 402.18, 423; 310/270, 310/271, 214, 261, 42; 228/119, 166; 219/76.14
See application file for complete search history.

(56) References Cited

U.S. PATENT DOCUMENTS

| | | | | |
|---|---|---|---|---|
| 4,394,879 A | * | 7/1983 | Reynolds | 164/76.1 |
| 5,085,363 A | * | 2/1992 | Sims | 228/119 |
| 5,113,114 A | * | 5/1992 | Shih et al. | 310/270 |
| 5,174,011 A | * | 12/1992 | Weigelt | 29/598 |
| 5,430,340 A | * | 7/1995 | Shih et al. | 310/214 |
| 5,528,097 A | * | 6/1996 | Gardner et al. | 310/270 |
| 5,861,698 A | * | 1/1999 | Murphy | 310/214 |
| 5,883,456 A | * | 3/1999 | Gardner et al. | 310/270 |
| 6,849,972 B1 | * | 2/2005 | Barnes et al. | 310/42 |
| 2007/0189849 A1 | * | 8/2007 | Beckford et al. | 403/355 |

* cited by examiner

*Primary Examiner*—Minh Trinh
(74) *Attorney, Agent, or Firm*—Sutherland Asbill & Brennan LLP

(57) ABSTRACT

A method to repair a rotor system having a coupling, a coupling keyway, a shaft, a shaft keyway, and a key. The method may include the steps of machining a shaft relief on the shaft adjacent to the coupling, providing fillet radii to the coupling keyway and the shaft keyway, adding a fretting resistant button to the key, machining a keyway relief on the shaft keyway, and machining a coupling relief on the coupling adjacent to the shaft. The method further may include the step of machining the key, the step of positioning dowels between the coupling and the shaft, and the step of shot-peening the coupling keyway and the shaft keyway.

8 Claims, 5 Drawing Sheets

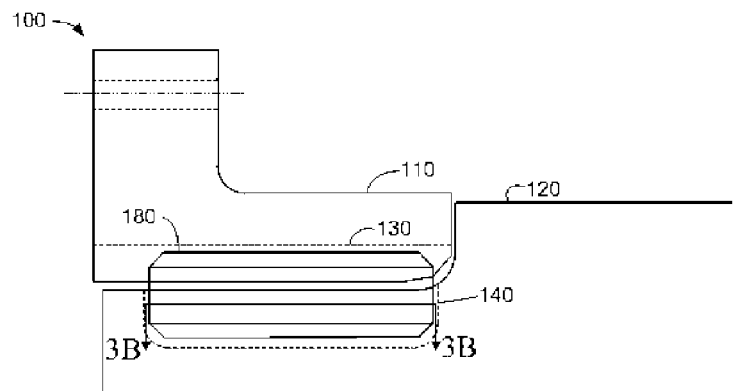
Fig. 3A
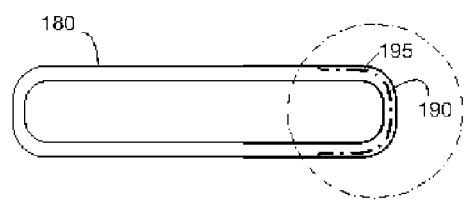
Fig. 3B
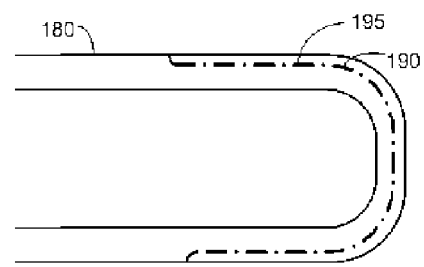
Fig. 3C
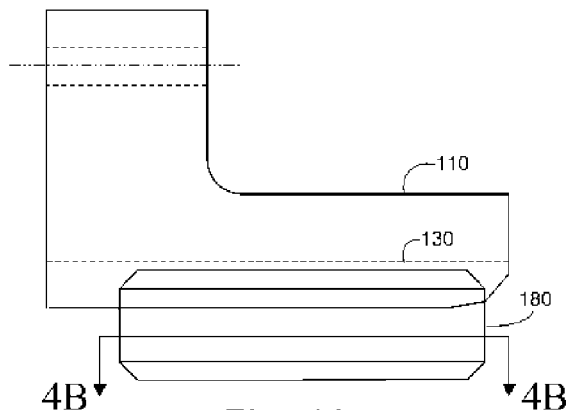
Fig. 4A
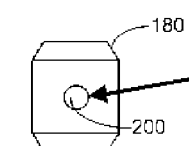
Fig. 4D
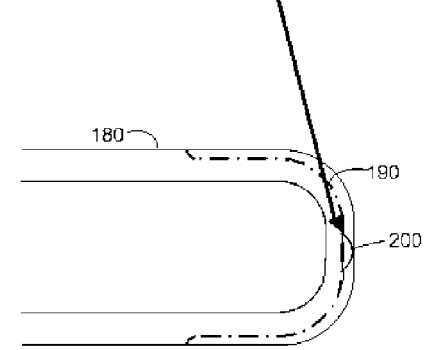
Fig. 4B
Fig. 4C

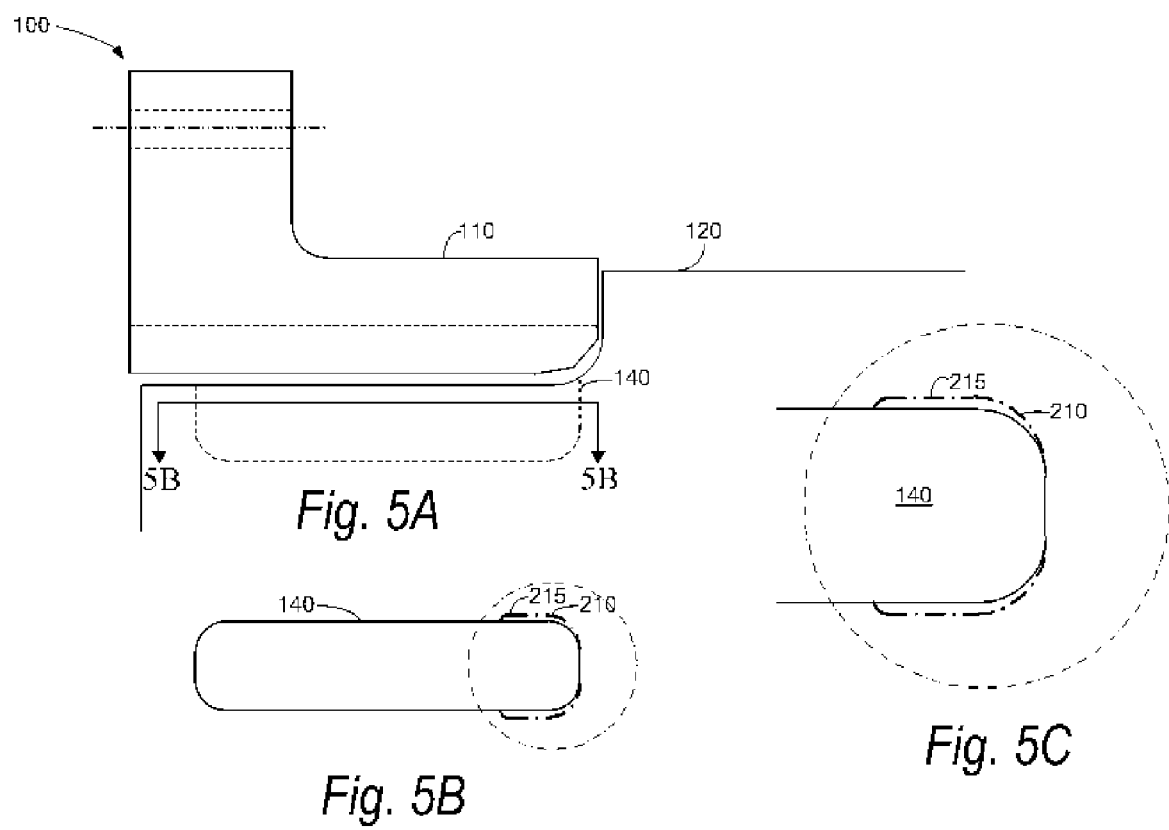

SYSTEMS AND METHODS FOR REPAIRING A ROTOR SYSTEM KEYWAY

TECHNICAL FIELD

The present application relates generally to generator rotors and more specifically relates to the repair of generator rotors with fretting damage and/or cracking.

BACKGROUND OF THE INVENTION

Generally described, conventional dynamoelectric machines have forged rotors of a magnetic material with radial slots formed therein. The slots are used for the connective turns of a number of field windings. The field windings are interconnected so as to produce a desired magnetic flux pattern.

Rotors generally have a cylindrical rotor body with a shaft extending towards the generator. A locking key or a similar element may be positioned at the turbine/generator coupling. This key resists the excess torque that may be generated during an in service fault condition. In such a condition, excess torque may be generated on the rotor shaft.

As the generators have aged, fretting and cracking have been experienced in the keyway, in the rotor, and in the inside diameter of the coupling. This cracking is initiated by fretting that is caused by a small amount of relative motion. Specifically, the locking key in the keyway may move slightly in relation to the rotor shaft and the coupling.

There is a desire therefore for an improved rotor design that would eliminate the fretting and cracking between the locking key and the coupling and the rotor shaft so as to improve fatigue life. The improved design may be a retrofit to existing equipment or the design may be provided in new equipment.

SUMMARY OF THE INVENTION

The present application thus provides a method to repair a rotor system having a coupling, a coupling keyway, a shaft, a shaft keyway, and a key. The method may include the steps of machining a shaft relief on the shaft adjacent to the coupling, providing fillet radii to the coupling keyway and the shaft keyway, adding a fretting resistant button to the key, machining a keyway relief on the shaft keyway, and machining a coupling relief on the coupling adjacent to the shaft. The method further may include the step of machining the key, the step of positioning dowels between the coupling and the shaft, and the step of shot-peening the coupling keyway and the shaft keyway.

The coupling may include a nose taper and the step of machining a shaft relief on the shaft may include machining the shaft adjacent to the nose taper. The step of providing fillet radii to the coupling keyway and the shaft keyway may include enlarging the fillet radii to the coupling keyway and the shaft keyway. The key may include an area of fretting and the step of machining the key may include machining the area of fretting. The step of adding a fretting resistant button to the key may include adding an aluminum button. The shaft keyway may include an area of fretting and the step of machining the shaft keyway may include machining the area of fretting. The coupling may include an area of fretting and the step of machining the coupling may include machining the area of fretting. The step of positioning dowels between the coupling and the shaft may include positioning straight or tapered dowels therein.

The present application further may provide a method to repair a rotor system having a coupling, a coupling keyway, a shaft, a shaft keyway, and a key. The method may include machining the shaft adjacent to the coupling, providing fillet radii to the coupling keyway and the shaft keyway, machining the key, adding a fretting resistant button to the key, machining the shaft keyway, machining the coupling adjacent to the shaft, positioning dowels between the coupling and the shaft, and shot-peening the coupling keyway and the shaft keyway.

The key may include an area of fretting and the step of machining the key may include machining the area of fretting. The shaft keyway may include an area of fretting and the step of machining the shaft keyway may include machining the area of fretting. The coupling may include an area of fretting and the step of machining the coupling may include machining the area of fretting.

The present application further may describe a rotor system. The rotor system may include a coupling with a coupling keyway, a shaft with a shaft keyway, and a key positioned within the coupling keyway and the shaft keyway. The shaft may include a shaft relief about the coupling, the key may include a key relief about the shaft keyway, the shaft keyway may include a keyway relief about the key, and the coupling may include a coupling relief about the shaft.

These and other features of the present application will become apparent to one of ordinary skill in the art upon review of the following detailed description when taken in conjunction with the drawings and appended claims.

BRIEF DESCRIPTION OF THE DRAWINGS

FIG. 3A is a side cross-sectional view of the coupling and shaft of FIG. 1 with the key shown.

FIG. 3B is a side cross-sectional view of the key of FIG. 3A.

FIG. 3C is an enlarged view of the key of FIG. 3B.

FIG. 4A is a side cross-sectional view of the coupling and the key.

FIG. 4B is a side cross-sectional view of the key of FIG. 4A.

FIG. 4C is an enlarged view of the key of FIG. 4B.

FIG. 4D is an enlarged view of the key of FIG. 4B.

FIG. 5A is a side cross-sectional view of the coupling and the shaft of FIG. 1.

FIG. 5B is a side cross-sectional view of the keyway of FIG. 5A.

FIG. 5C is an enlarged view of the keyway of FIG. 5B.

DETAILED DESCRIPTION

Figure 1:
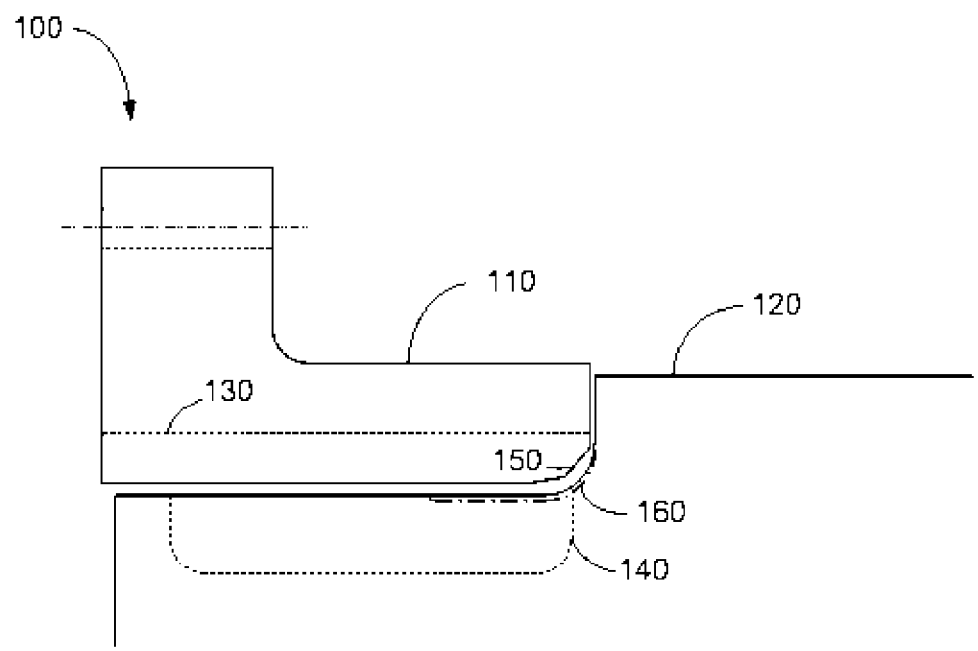
FIG. 1 is a side cross-sectional view of a coupling and a rotor shaft as is described herein.

Referring now to the drawings in which like numerals refer to like elements throughout the several views, FIG. 1 shows the rotor system 100 as is described herein. The rotor system 100 includes a generator coupling 110 and a rotor shaft 120.

The coupling 110 has a coupling keyway 130 shown in dashed lines. Likewise, the rotor shaft 120 has a shaft keyway 140 shown in dashed lines. The coupling 110 also includes a nose taper 150 as is shown at one end thereof.

The first repair step is to machine a relief 160 into the rotor shaft 120 under the coupling nose taper 150. The relief 160 will eliminate the shrink in the nose taper 150 where the relative motion is caused between the coupling/rotor and the locking key (described below). The use of the relief 160 also will help to reduce the fretting of the rotor shaft 120.

Figure 2A:
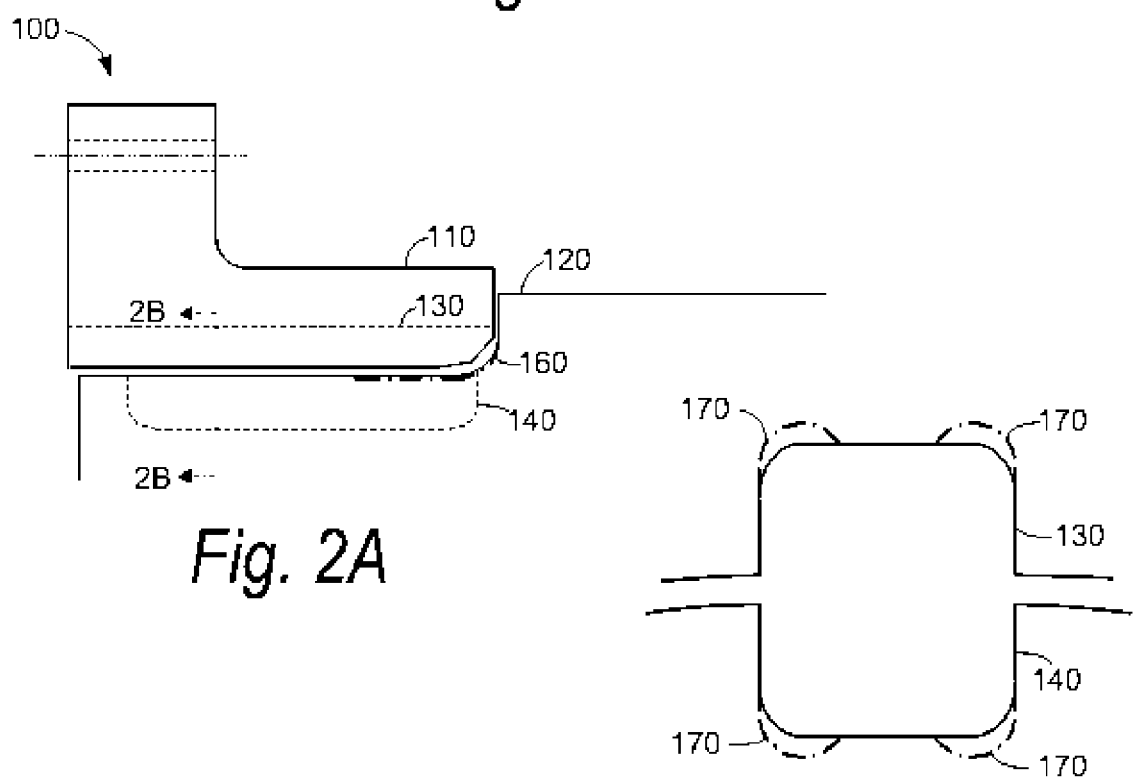
FIG. 2A is a side cross-sectional view of the coupling and the shaft of FIG. 1.
Figure 2B:
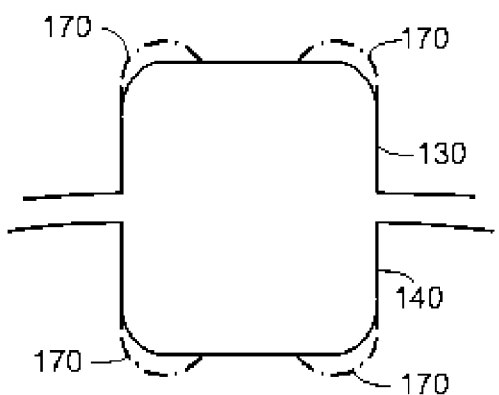
FIG. 2B is a side cross-sectional view of the keyway of FIG. 2A with increased fillet radii.

FIGS. 2A and 2B show the second repair step. Specifically, a number of fillet radius 170 are provided or enlarged in the coupling keyway 130 and the shaft keyway 140. These fillet radiuses 170 provide for more fatigue margin for the rotor shaft 120 about the keyways 130, 140.

FIGS. 3A-3C show the third repair step. In FIG. 3A, a key 180 is shown positioned within the coupling keyway 130 and the shaft keyway 140. As is shown in FIGS. 3B and 3C, a key relief 190 is formed in one end of the key 180. The key relief 190 limits contact between the key 180 and the shaft keyway 140 so as to reduce fretting. Any existing area of fretting 195 also may be removed.

FIGS. 4A-4C show the fourth repair step. In this step, a button 200 is added to the end of the key 180. The button 200 may be made out of aluminum or other types of substantially fretting resistant material. The button 200 provides for axial positioning of the key 180 while preventing fretting on the shaft keyway 140.

FIGS. 5A-5C show the fifth repair step. To the extent that the shaft keyway 140 includes an area of fretting 210, the area of fretting 210 may be machined in a controlled manner to eliminate the fretting and/or small cracks. The machining also may prevent or reduce any fretting in the future by providing a relief 215 between the key 180 and the shaft keyway 140.

Figure 6:
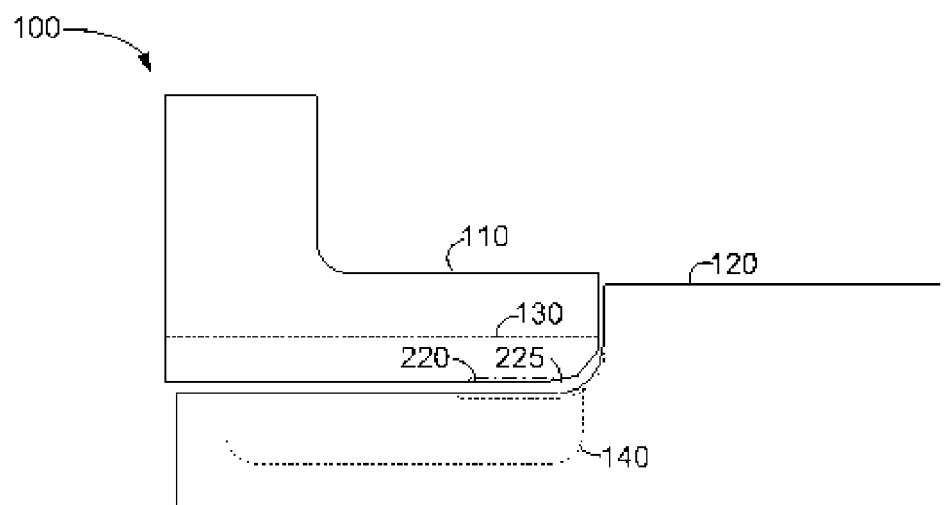
FIG. 6 is a side cross-sectional view of the coupling and the shaft of FIG. 1.

FIG. 6 shows the sixth repair step. To the extent that the coupling 110 includes an area of fretting 220, this area of fretting 220 also may be machined in a controlled manner to eliminate any existing fretting and/or small cracks and to prevent or reduce any fretting in the future by providing a relief 225 between the shaft 120 and the coupling 110.

Figure 7A:
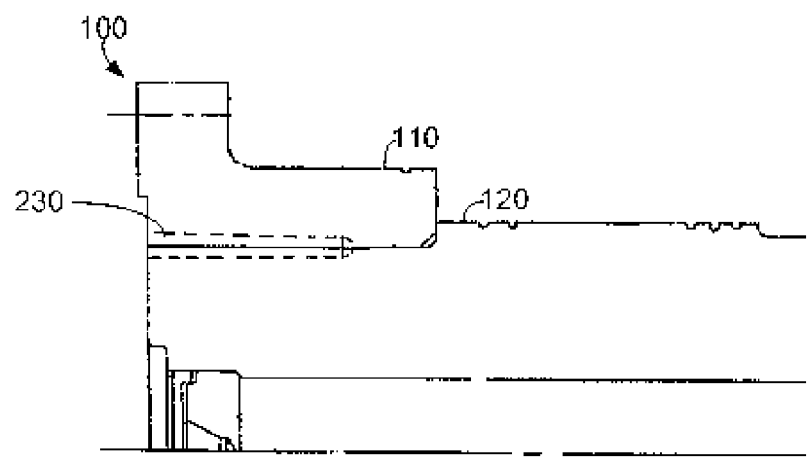
FIG. 7A is a side view of the coupling and the shaft.
Figure 7B:
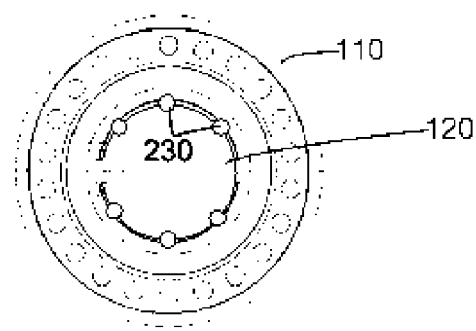
FIG. 7B is a side cross-sectional view of the coupling and the shaft with the addition of the dowels.

FIGS. 7A and 7B show the seventh repair step. As is shown, a number of tapered or straight dowels 230 may be positioned between the coupling 110 and the rotor shaft 120. The dowels 230 may be necessary because the length of the key 180 may be reduced as described above. The dowels 230 also provide additional torque carrying capability. Any number of dowels 230 may be used herein.

Figure 8A:
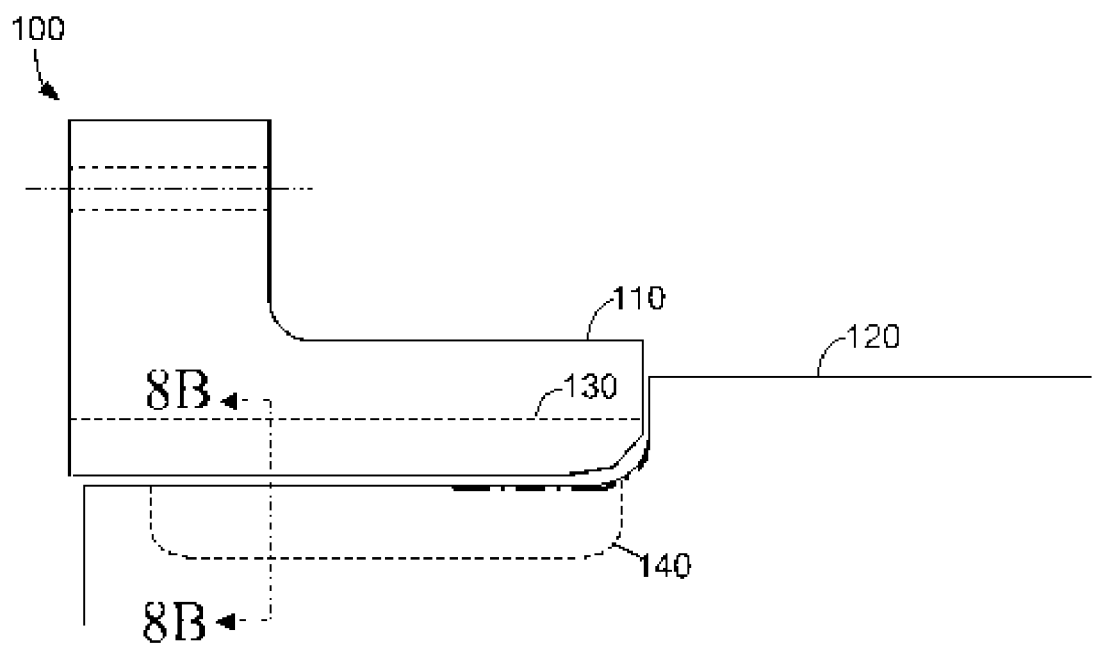
FIG. 8A is a side cross-sectional view of the coupling and the shaft of FIG. 1.
Figure 8B:
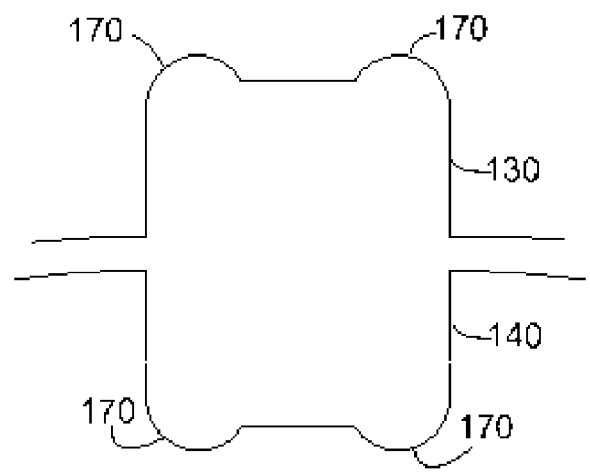
FIG. 8B is a side cross-sectional view of the keyway of FIG. 8A.

FIGS. 8A and 8B show the eighth repair step. The coupling keyway 130, the shaft keyway 140, and the fillet radiuses 170 may be shot-peened to induce compressive stresses on the surface. This shot-peening will give an additional margin to prevent fretting and fatigue crack initiation.

Although the combination of these various methods steps and elements may serve to eliminate or reduce existing and potential fretting and/or fatigue cracks, not all of the steps must be carried out in combination. For example, in many rotor systems 100, the elements of FIGS. 1, 2, 4, 5, and 6 may be sufficient to achieve the goals intended herein. Other rotor systems 100 may include even fewer methods steps as those described herein. Further, additional repair steps also may be used herein as is desired.

It should be apparent that the foregoing relates only to the preferred embodiments of the present application and that numerous changes and modifications may be made herein by one of ordinary skill in the art without departing from the general spirit and scope of the invention as defined by the following claims and the equivalents thereof.

What is claimed is:

1. A method to repair a rotor system having a coupling, a coupling keyway, a shaft, a shaft keyway, and a key, comprising:
   machining the shaft adjacent to the coupling;
   providing fillet radii to the coupling keyway and the shaft keyway;
   machining the key;
   adding a fretting resistant button to the key;
   machining the shaft keyway;
   machining the coupling adjacent to the shaft;
   positioning dowels between the coupling and the shaft; and
   shot-peening the coupling keyway and the shaft keyway.

2. The method of claim 1, wherein the key includes an area of fretting and wherein the step of machining the key comprises machining the area of fretting.

3. The method of claim 1, wherein the shaft keyway includes an area of fretting and wherein the step of machining the shaft keyway comprises machining the area of fretting.

4. The method of claim 1, wherein the coupling includes an area of fretting and wherein the step of machining the coupling comprises machining the area of fretting.

5. The method of claim 1, wherein the coupling includes a nose taper and wherein the step of machining the shaft comprises machining the shaft adjacent to the nose taper.

6. The method of claim 1, wherein the step of providing fillet radii to the coupling keyway and the shaft keyway comprises enlarging the fillet radii to the coupling keyway and the shaft keyway.

7. The method of claim 1, wherein the step of adding a fretting resistant button to the key comprises adding an aluminum button.

8. The method of claim 1, wherein the step of positioning dowels between the coupling and the shaft comprises positioning straight or tapered dowels therein.

* * * * *